United States Patent [19]

Sakuta et al.

[11] Patent Number: 4,975,121

[45] Date of Patent: Dec. 4, 1990

[54] DURABLITY IMPROVING AGENT FOR CEMENT-HYDRAULIC-SET SUBSTANCES, METHOD OF IMPROVING SAME, AND CEMENT-HYDRAULIC SET SUBSTANCES IMPROVED IN DURABILITY

[75] Inventors: Masaharu Sakuta; Toshio Saito, both of Tokyo; Kunio Yanagibashi, Narashino, all of Japan

[73] Assignees: Fujisawa Pharmaceutical Co., Ltd.; Takenaka Corporation, both of Osaka; Nippon Nyukazai Co., Ltd., Tokyo, all of Japan

[21] Appl. No.: 379,368

[22] Filed: Jul. 13, 1989

[30] Foreign Application Priority Data

Jul. 15, 1988 [JP] Japan .................................. 63-177297

[51] Int. Cl.$^5$ ............................................. C04B 24/00
[52] U.S. Cl. .................................... 106/724; 106/802; 106/823
[58] Field of Search .................... 106/96, 314, 315; 524/4

[56] References Cited

U.S. PATENT DOCUMENTS

| | | | |
|---|---|---|---|
| 2,798,003 | 7/1957 | Morgan et al. | 106/90 |
| 2,965,678 | 12/1960 | Sandberg et al. | 106/90 |
| 4,209,336 | 6/1980 | Previte | 106/90 |

FOREIGN PATENT DOCUMENTS

| | | |
|---|---|---|
| 593430 | 10/1977 | Japan . |
| 57-145054 | 6/1980 | Japan . |
| 56-37259 | 4/1981 | Japan . |

*Primary Examiner*—William R. Dixon, Jr.
*Assistant Examiner*—Alan Wright
*Attorney, Agent, or Firm*—Oblon, Spivak, McClelland, Maier & Neustadt

[57] ABSTRACT

The present invention provides a method for improving the durability of cement-hydraulic substances, the method decreasing the dry shrinkage of cement-hydraulic-set substances such as concrete, mortar or related substances, and increasing resistance to a repetition of the freezing and thawing of the cement-hydraulic-set substances, by the use of terminal alkyletherified compounds or terminal alkylesterified compounds of polymers having —$C_2H_5O$— and/or —$C_3H_6O$— as a repetitive unit.

16 Claims, No Drawings

DURABLITY IMPROVING AGENT FOR CEMENT-HYDRAULIC-SET SUBSTANCES, METHOD OF IMPROVING SAME, AND CEMENT-HYDRAULIC-SET SUBSTANCES IMPROVED IN DURABILITY

BRIEF SUMMARY OF THE INVENTION

The present invention relates to a method for improving the durability of cement-hydraulic substances, the method sharply decreasing the drying shrinkage of cement-hydraulic substances such as concrete, mortar or related substances, and repressing deterioration when the cement-hydraulic substances are subjected to freeze-thaw cycles.

In general, mixtures of cements and water, such as concrete, mortar, grout, etc., display the decrease of volume with setting and drying. Such a phenomenon, called "drying shrinkage", is thought to be a main cause for cracks on concrete walls and floor slabs. The cracks result in a lowering of the serviceability and a decrease in stiffness of structures. Further, water and air penetrate into concrete from crack portions, thereby promoting the carbonation of the concrete and corrosion of reinforcing bars in the concrete, which leads to a significant decrease in durability of the structures.

General measures to avoid the cracking caused by the drying shrinkage are as follows:

(i) Joints are provided so as to concentrate cracks on the joint portions and avoid cracking in other portions, and, (ii) Additional reinforcing bars are arranged in places where cracks are apt to be formed. The bars can restrain cracking width. If either measure was taken, the formation of the cracks could not be prevented entirely. Moreover, attempts have been made to mix concrete, etc. with expansive admixture to avoid the cracking caused by the drying shrinkage. However, since an expensive phenomenon due to the admixture is completed in an early stage of a cement hydration, the attempts are not effective to restrain the drying shrinkage over a long period of service life, and it is difficult to determine a proper addition amount of the expansive agent required to suppress the drying shrinkage. Thus, such attempts have given rise to problems to be solved.

Under such circumstances, it has become apparent that decreasing the dry shrinkage itself would be most effective for the prevention of the cracking caused by the drying shrinkage in concrete, etc.

Meanwhile, exposure of cement-hydraulic substances such as concrete, mortar, etc. to weather means that they are subjected to freeze-thaw cycles due to high and low temperatures, which results in the formation of fine internal cracks in the cement-hydraulic substances such as concrete, mortar and the like. Occurence of such cracks lead to a breakdown of the hydraulic substances.

In order to prevent the loss of durability of hardened cement hydraulic substances due to freeze-thaw, it has been common practice to use air-entraining (AE) agents adapted to entrain fine air voids in the hardened cement hydraulic substances to relieve and absorb the pressure of expansion at freezing [See, for example, Concrete Engineering Handbook, Asakura-Shoten K. K., 1981 Edition, pp. 139–143].

However, as any air-entraining agent liberates a large number of air voids within the hardened cement hydraulic substances, the drying shrinkage, water permeability and the rate of carbonation of, concrete are increased, to mention only a few of the problems, with the result that the durability of, steel-reinforced concrete structures are adversely affected.

Furthermore, a drying shrinkage-reducing agent for the prevention of cracking is presented in Japanese Patent Publication Sho 59-3430. With the agent, however, breakdown due to a repetition of freezing and thawing can not be prevented.

Furthermore, other reforming agents are well known as presented in Japanese Patent Publication Sho 56-37259 and Sho 57-145054, but neither of them can be defined satisfactory from the view of their effect for suppressing carbonation.

The present invention has been made intensively to solve the above various problems. It is an object of the invention to provide a durability improving agent which can, not only sharply decrease the drying shrinkage of cement-hydraulic substances, but also effectively suppress the deterioration due to freezing and thawing and inhibit the carbonation, thereby sharply improving the durability of the cement-hydraulic substances. Yet another object of the invention is to provide a method of improving the durability of cement-hydraulic substances by the use of the durability improving agent. A still further object of the invention is to provide cement-hydraulic substances improved in durability.

DETAILED DESCRIPTION OF THE INVENTION

The present invention relates to a durability improving agent for cement-hydraulic substances, which contains one or more kinds of compounds of the general formula $$R-O-Z-H \qquad (I)$$

wherein R denotes an alkyl group having 8 to 18 carbon atoms, an alkanoyl group having 8 to 19 carbon atoms, or an alkenoyl group having 8 to 19 carbon atoms and Z denotes a group in which none or any whole number of $-C_2H_4O-$ radicals are bonded to none or any whole number of $-C_3H_6O-$ radicals in random order, the group containing at least one $-C_2H_4O-$ radical and/or at least one $-C_3H_6O-$ radical. The aforesaid durability improving agent is mixed in an amount of 0.1 to 8.0 parts by weight with 100 parts by weight of cement, thereby obtaining the cement-hydraulic substance having an excellent durability.

In the compound of the general formula (I) which acts as the durability improving agent in the invention, the alkyl group having 8 to 18 carbon atoms includes n-octyl, 2-ethylhexyl, nonyl, decyl, undecyl, dodecyl, tridecyl, cetyl, pentadecyl, heptadecyl, stearyl, etc., and the alkanoyl group having 8 to 19 carbon atoms includes octanoyl, nonanoyl, capryloyl, undecanoyl, lauryloyl, tridecanoyl, myristoyl, pentadecanoyl, palmitoyl, heptadecanoyl, stearoyl, etc., and further the alkenoyl group having 8 to 19 carbon atoms includes oleoyl, etc. A compound with alkyl group having 8 to 18 carbon atoms, alkanoyl group or alkenoyl group having 8 to 19 carbon atoms has an carbonation inhibiting effect stronger than that of a compound with alkyl group having 7 or less carbon atoms and exhibits its excellent effect of suppressing carbonation against cement hydraulic substances.

In the general formula (I), Z represents a group in which none or any natural number of $-C_2H_4O-$ radicals are bonded to none or any whole number of $-C_3H_6O-$ radicals in random order, the group containing at least one $-C_2H_4O-$ radical and/or at least one $-C_3H_6O-$ radical. Namely, $-Z-$ represents a residue of a single adduct or polymer of ethylene oxide or propylene oxide, or a residue of a block copolymer or random copolymer of ethylene oxide and propylene oxide. Examples of the preferred group are shown below.

(i) In the case of a single adduct or polymer of ethylene oxide, the number of $-C_2H_4O-$ radicals preferably ranges from 1 to 4.

(ii) In the case of a single adduct or polymer of propylene oxide, the number of $-C_3H_6O-$ radicals preferably ranges from 1 to 30.

(iii) In the case of a block copolymer or random copolymer of ethylene oxide and propylene oxide, it is preferable that the total number of $-C_2H_4O-$ radicals and $-C_3H_6O-$ radicals is 2 to 30 and ($-C_2H_4O-$ radical)/($-C_3H_6O-$ radical) (mole ratio) is less than 1.0.

The aforesaid compounds of the general formula (I) can easily be obtained, for example, by the reaction of lauryl alcohol, lauric arid, etc. with monomers or polymers (oligomers being included) of ethylene oxide and/or propylene oxide.

The representative compounds of the general formula (I) and examples of the preparation thereof are shown below.

| Compound No. | Structural Formula |
| --- | --- |
| 1. | $C_4H_9\underset{\underset{C_2H_5}{\|}}{C}HCH_2-O-(C_3H_6O)_3H$ |
| 2. | $C_4H_9\underset{\underset{C_2H_5}{\|}}{C}HCH_2-O-(C_3H_6O)_6H$ |
| 3. | $C_4H_9\underset{\underset{C_2H_5}{\|}}{C}HCH_2-O-(C_3H_6O)_9H$ |
| 4. | $C_4H_9\underset{\underset{C_2H_5}{\|}}{C}HCH_2-O-(C_2H_4O)_2H$ |
| 5. | $C_{12}H_{25}-O-(C_3H_6O)_8H$ |
| 6. | $C_{12}H_{25}-O-(C_3H_6O)_{12}H$ |
| 7. | $C_{17}H_{33}-COO-(C_3H_6O)_{18}H$ |
| 8. | $C_{11}H_{23}-COO-(C_3H_6O)_{12}H$ |

PREPARATION EXAMPLE 1

2-ethyl hexanol (380 g) and sodium hydroxide (1.5 g) as a catalyst were placed in a 1 l autoclave, temperature was slowly raised while introducing nitrogen gas, and dehydration was effected while keeping the temperature at 100° to 110° C. for 30 minutes. Then, the autoclave was closed, followed by admitting propylene oxide (500 g) pressurized, at a temperature of 100° to 150° C. After addition reaction for 3 hours at the same temperature, the resulting reaction mixture was further matured for 30 minutes at the temperature. After cooling, the autoclave was opened, followed by neutralization and purification, thereby obtaining a light-yellow liquid compound 1 (834 g).

PREPARATION EXAMPLE 2

Using 2-ethyl hexanol (200 g), sodium hydroxide (1.5 g) and propylene oxide (535 g), a compound 2 (685 g) was obtained in a similar manner as in Preparation Example 1.

PREPARATION EXAMPLE 3

Using 2-ethyl hexanol (160 g), sodium hydroxide (1.5 g) and propylene oxide (535 g), a compound 3 (762 g) was obtained in a similar manner as in Preparation Example 1.

PREPARATION EXAMPLE 4

Using 2-ethyl hexanol (420 g), sodium hydroxide (1.5 g) and ethylene oxide (352 g), a compound 4 (730 g) was obtained in a similar manner as in Preparation Example 1.

PREPARATION EXAMPLE 5

Using dodecyl alcohol (220 g), sodium hydroxide (1.5 g) and propylene oxide (549 g), a compound 5 (754 g) was obtained in a similar manner as in Preparation Example 1.

PREPARATION EXAMPLE 6

Using dodecyl alcohol (186 g), sodium hydroxide (1.5 g) and propylene oxide (696 g), a compound 6 (838 g) was obtained in a similar manner as in Preparation Example 1.

PREPARATION EXAMPLE 7

Using oleic acid (180 g), sodium hydroxide (1.0 g) and propylene oxide (666 g), a compound 7 (803 g) was obtained in a similar manner as in Preparation Example 1.

PREPARATION EXAMPLE 8

Using lauric acid (200 g), sodium hydroxide (1.5 g) and propylene oxide (696 g), a compound 8 (841 g) was obtained in a similar manner as in Preparation Example 1.

When the above-obtained compounds of the general formula (I) is contained in proper amounts in cement-hydraulic substances having cement for their setting component, dry shrinkage is sharply decreased without a bad influence upon compressive strength, and durability against freezing and thawing is greatly improved and carbonation is greatly inhibited. Methods for including the compounds in the cement-hydraulic substances are not restricted at all. Among the methods available are the method comprising to addition to mixing water and cement, the method comprising to addition to mixed concrete composition, and the method resorting to addition in the middle of conveyance by concrete mixer trucks, etc. or after arrival at construction fields. These methods can be adopted suitably. The optimum method may be selected every time taking into account the kinds and addition amounts of the compounds of the general formula (I) and the kinds and application conditions of the cement-hydraulic substances. The compounding proportion of the compounds must be 0.1 to 8.0 parts by weight based on 100 parts by weight of cement. With less than 0.1 part by weight, the above-described durability improving effect is hardly shown, and with more than 8.0 parts by weight, compressive strength is lowered. Accordingly, the compounding proportion of the compounds is more preferably 1 to 6 parts by weight.

No restrictions are placed on the kind of cement constituting the cement-hydraulic substances according to the invention, and the kinds and amounts of aggregate and other admixtures. Commercially available cements, such as normal Portland cement, early-strength cement, moderate heat cement, blast furnace cement, fly ash cement, etc., may be used properly according to purposes and performances required. According to circumstances, a part of the cement may be replaced by fly ash, water granulated slag powder, siliceous admixtures, etc. thereby to modify physical properties of the cement-hydraulic substances. Further, known concrete admixtures, such as water reducing agents and expansive agents for cement, may be used in combination with the cement.

TEST EXAMPLE 1

Drying Shrinkage Test and Freezing and Thawing Test on Concrete:

(1) Concrete Test Conditions

In the tests were used normal Portland cement (mixture of equal volumes of Onoda cement, Asano cement and Sumitomo cement, specific gravity: 3.16), river sand (FM: 2.79, specific gravity: 2.64) from the Fuji river as fine aggregate, and crushed stones (maximum size: 20 mm, FM: 6.69, specific gravity: 2.67) from Kasama as coarse aggregate.

Mixing and curing were performed at 20° C. A plain concrete was designed with a slump of 18 cm. All test mixtures were formulated according to the same mix proportion as the plain concrete.

The composition of concrete is shown in Table 1.

TABLE 1

| | | | | Composition of concrete | | | |
|---|---|---|---|---|---|---|---|
| | | | | | Materials used per 1 m³ of concrete (Kg/m³) | | |
| Slump (cm) | Air content (%) | Water-cement ratio (%) | Sand percentage (%) | Cement | Water | Fine aggregate | Coarse aggregate |
| 18 | 1 | 63.8 | 49.0 | 320 | 204 | 886 | 932 |

Prescribed amounts (% by weight to cement) of compounds subjected to the tests were added as a part of mixing water.

Specimens for the drying shrinkage test and freezing and thawing test were prepared in accordance with JIS A1132.

Procedure of curing the specimens and measuring the drying shrinkage in the drying test were in conformity to JIS A1129, and drying shrinkage was measured by the comparator method.

After water-cured until the age of 2 weeks, the specimens for the freezing and thawing test were permitted to stand in a room (20° C., R.H.: 60±5%) for 7 days so that they attained the similar moisture content to actual structure, followed by carrying out the freezing and thawing test. The freezing and thawing test was conducted in accordance with JIS A6204 annex-2. Thus freezing and thawing cycle of +5° C. to −18° C. was repeated with a cycle time of about 3.5-hour per cycle and the relative dynamic modulus of elasticity was determined at every prescribed cycle. Primary resonance frequency of flexural oscillation was obtained in conformity to JIS A1127, and the relative dynamic modulus of elasticity was calculated by the following equation.

$$\text{Relative dynamic modulus of elasticity (\%)} = \frac{f_n^2}{f_o^2} \times 100$$

$f_n$: the primary resonance frequency of the specimen in each cycle $f_o$: the primary resonance frequency before initiation of the freezing and thawing test The results of the dry shrinkage test and those of the freezing and thawing test are shown in Table 2 and Table 3, respectively.

TABLE 2

| | Results of dry shrinkage test | | |
|---|---|---|---|
| | | Drying shrinkage (x 10⁻⁴) Days after drying | |
| Compound tested | Addition amount (% by weight to cement) | 1 week | 4 weeks |
| Plain | 0 | 1.10 | 2.86 |
| Compound 1 obtained in Preparation Example 1 | 2 | 0.65 | 1.44 |
| Compound 2 obtained in Preparation Example 2 | 2 | 0.36 | 0.91 |
| Compound 3 obtained in Preparation Example 3 | 2 | 0.53 | 1.13 |
| Compound 4 obtained in Preparation Example 4 | 2 | 0.37 | 0.74 |
| Compound 5 obtained in Preparation Example 5 | 2 | 0.70 | 1.64 |
| Compound 6 obtained in Preparation Example 6 | 2 | 0.58 | 1.58 |
| Compound 7 obtained in Preparation Example 7 | 2 | 0.66 | 1.79 |
| Compound 8 obtained in Preparation Example 8 | 2 | 0.58 | 1.74 |

TABLE 3

| | Results of freezing and thawing test | | | | | | | |
|---|---|---|---|---|---|---|---|---|
| | Addition (%) | Relative dynamic modulus of elasticity (%) | | | | | | |
| Compound | | 0 cycle | 35 | 70 | 100 | 135 | 170 | 200 |
| Plain | 0 | 100 | 80 | 74 | 31 | | | |
| Compound 1 obtained in Preparation Example 1 | 2 | 100 | 98 | 98 | 98 | 97 | 98 | 98 |
| Compound 2 obtained in Preparation Example 2 | 2 | 100 | 99 | 99 | 99 | 99 | 99 | 99 |
| Compound 3 obtained in | 2 | 100 | 98 | 98 | 99 | 99 | 99 | 99 |

TABLE 3-continued

| Compound | Results of freezing and thawing test | | | | | | | |
|---|---|---|---|---|---|---|---|---|
| | Addition (%) | Relative dynamic modulus of elasticity (%) | | | | | | |
| | | 0 cycle | 35 | 70 | 100 | 135 | 170 | 200 |
| Preparation Example 3 | | | | | | | | |
| Compound 4 obtained in Preparation Example 4 | 2 | 100 | 98 | 98 | 98 | 98 | 95 | 95 |
| Compound 5 obtained in Preparation Example 5 | 2 | 100 | 99 | 99 | 99 | 99 | 99 | 99 |
| Compound 6 obtained in Preparation Example 6 | 2 | 100 | 98 | 99 | 99 | 99 | 99 | 99 |
| Compound 7 obtained in Preparation Example 7 | 2 | 100 | 98 | 98 | 99 | 98 | 97 | 92 |
| Compound 8 obtained in Preparation Example 8 | 2 | 100 | 97 | 96 | 97 | 96 | 94 | 92 |

According to the present invention, of the above-described composition, the dry shrinkage of cement-hydraulic-set substances is decreased sharply without exerting a bad influence upon the compressive strength thereof, and deterioration due to a repetition of freezing and thawing is suppressed remarkably, thereby improving durability sharply.

We claim:

1. A method for improving the durability of cement-hydraulic substances, which comprises mixing 0.1 to 8.0 parts by weight of a durability improving agent with 100 part of weight of cement, followed by setting, wherein said durability improving agent comprises a compound of the formula

R—O—Z—H wherein R denotes an alkyl group having 8 carbon atoms, and Z denotes a group in which none or a whole number of —$C_2H_4O$— radicals are bonded to none or a whole number of —$C_3H_6O$— radicals in random order, the group containing at least one —$C_2H_4O$— radical or at least one —$C_3H_6O$— radical, with the proviso that:

(1) in the case of a single adduct or polymer of ethylene oxide, the number of —$C_2H_4O$— radicals is 1 to 4,
(2) in the case of a single adduct or polymer of propylene oxide, the number of —$C_3H_6O$— radicals is 1 to 30,
(3) in the case of a block copolymer or random copolymer of ethylene oxide and propylene oxide, the total number of —$C_2H_4O$— radicals and —$C_3H_6O$— radicals is 2 to 30, and the mole ratio of —$C_2H_4O$—/—$C_3H_6O$— is less than 1.0.

2. Cement-hydraulic substances improved in durability, wherein 0.1 to 8.0 parts by weight of a durability improving agent is contained in 100 parts by weight of cement, said durability improving agent comprising a compound of the formula

R—O—Z—H wherein R denotes an alkyl group having 8 carbon atoms, and Z denotes a group in which none or a whole number of —$C_2H_4O$— radicals are bonded to none or a whole number of —$C_3H_6O$— radicals in random order, the group containing at least one —$C_2H_4O$— radical or at least one —$C_3H_6O$— radical, with the proviso that:

(1) in the case of a single adduct or polymer of ethylene oxide, the number of —$C_2H_4O$— radicals is 1 to 4,
(2) in the case of a single adduct or polymer of propylene oxide, the number of —$C_3H_6O$— radicals is 1 to 30,
(3) in the case of a block copolymer or random copolymer of ethylene oxide and propylene oxide, the total of number —$C_2H_4O$— radicals and —$C_3H_6O$— radicals is 2 to 30, and the mole ratio of —$C_2H_4O$—/—$C_3H_6O$— is less than 1.0.

3. The method of claim 1 wherein the agent is a single adduct or polymer of ethylene oxide, and the number of —$C_2H_4O$— radicals is 1 to 4.

4. The method of claim 1 wherein the agent is a single adduct or polymer of propylene oxide, and the number of —$C_3H_6O$— radicals is 1 to 30.

5. The method of claim 1 wherein the agent is a block copolymer or random copolymer of ethylene oxide and propylene oxide, the total number of —$C_2H_4O$— radicals and —$C_3H_6O$— radicals is 2 to 30, and the mole ratio of —$C_2H_4O$—/—$C_3H_6O$— is less than 1.0.

6. The cement-hydraulic substances of claim 2 wherein the agent is a single adduct or polymer of ethylene oxide, and the number of —$C_2H_4O$— radicals is 1 to 4.

7. The cement-hydraulic substances of claim 2 wherein the agent is a single adduct or polymer of propylene oxide, and the number of —$C_3H_6O$— radicals is 1 to 30.

8. The cement-hydraulic substances of claim 2 wherein the agent is a block copolymer of random copolymer of ethylene oxide and propylene oxide, the total number of —$C_2H_4O$— radicals and —$C_3H_6O$— radicals is 2 to 30, and the mole ratio of —$C_2H_4O$—/—$C_3H_6O$— is less than 1.0.

9. The method of claim 1 wherein R is 2-ethylhexyl group and Z is —($C_3H_6O$)$_n$—, n representing a whole number of 3 to 9.

10. The method of claim 16 wherein n is 2.

11. The method of claim 1 wherein R is 2-ethylhexyl group and Z is —($C_2H_4O$)$_m$—, m representing a whole number of 1 to 4.

12. The method of claim 11 wherein m is 2.

13. The cement-hydraulic substances of claim 2 wherein R is 2-ethylhexyl group and Z is —($C_3H_6O$)$_n$—, n representing a whole number of 3 to 9.

14. The substances of claim 20 wherein n is 2.

15. The cement-hydraulic substances of claim 2 wherein R is 2-ethylhexyl group and Z is —($C_2H_4O$)$_m$—, m representing a whole number of 1 to 4.

16. The substances of claim 15 wherein m is 2.

* * * * *